(12) United States Patent
Wagoner et al.

(10) Patent No.: US 6,466,729 B1
(45) Date of Patent: *Oct. 15, 2002

(54) CONTROLLABLE FIBER OPTIC ATTENUATORS EMPLOYING TAPERED AND/OR ETCHED FIBER SECTIONS

(75) Inventors: Gregory A. Wagoner, Watervliet, NY (US); Kevin J. McCallion, Boston, MA (US); Walter Johnstone, Glasgow (GB); Kwok Pong Chan, Troy; David G. Gascoyne, Schenectady, both of NY (US)

(73) Assignee: Molecular Optoelectronics Corporation, Watervliet, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/539,469

(22) Filed: Mar. 30, 2000

(51) Int. Cl.[7] .................................................. G02B 6/00
(52) U.S. Cl. ...................................... 385/140; 385/92
(58) Field of Search ............................ 385/92, 94, 140

(56) References Cited

U.S. PATENT DOCUMENTS

| | | | |
|---|---|---|---|
| 4,469,544 A | | 9/1984 | Goodman .................. 156/345 |
| 4,469,554 A | | 9/1984 | Turner ...................... 156/657 |
| 4,630,890 A | | 12/1986 | Ashkin et al. ............ 350/96.3 |
| 4,704,151 A | | 11/1987 | Keck .......................... 65/4.1 |
| 4,773,924 A | | 9/1988 | Berkey ...................... 65/3.11 |
| 4,778,237 A | * | 10/1988 | Sorin et al. ................ 385/122 |
| 5,067,788 A | | 11/1991 | Jannson et al. .............. 385/2 |
| 5,136,818 A | * | 8/1992 | Bramson et al. ........... 356/73.1 |
| 5,265,178 A | * | 11/1993 | Braun et al. ................ 385/1 |
| 5,290,398 A | | 3/1994 | Feldman et al. ............ 156/651 |
| 5,781,675 A | | 7/1998 | Tseng et al. ................ 385/30 |
| 5,966,493 A | * | 10/1999 | Wagoner et al. ............ 385/140 |
| 6,191,224 B1 | * | 2/2001 | Chan et al. ................ 358/901.1 |
| 6,205,280 B1 | * | 3/2001 | Wagoner et al. ............ 385/12 |
| 6,335,998 B2 | * | 1/2002 | Wagoner et al. ............ 385/12 |

FOREIGN PATENT DOCUMENTS

| | | |
|---|---|---|
| EP | 0686867 A1 | 12/1995 |
| GB | 1257825 | 12/1971 |
| WO | WO 00/49434 | 8/2000 |

OTHER PUBLICATIONS

Morozov et al., "Fused Fiber Optic Variable Attenuator", OFC 2000, 25th Annual Optical Fiber Communications Conference, Mar. 10, 2000, pp. 22–24.

(List continued on next page.)

*Primary Examiner*—Akm E. Ullah
*Assistant Examiner*—Michelle R. Connelly-Cushwa
(74) *Attorney, Agent, or Firm*—Kevin P. Radigan, Esq.; Heslin Rothenberg Farley & Mesiti P.C.

(57) ABSTRACT

Controllable fiber optic attenuators and attenuation systems are disclosed for controllably extracting optical energy from a fiber optic, and therefore attenuating the optical signal being transmitted through the fiber optic. A portion of the fiber optic is etched or tapered, thereby providing a side surface through which optical energy can be extracted. The portion of the fiber is suspended between two support points, and a controllable material is formed over the surface for controllably extracting optical energy according to a changeable stimulus applied thereto, which affects the refractive index thereof. In one embodiment, the changeable stimulus is temperature, and a controllable heating/cooling source can be provided in the attenuator for control of the attenuation. The limited amount of thermal contact between the suspended portion of the fiber optic and the controllable material to surrounding structures offers a more predictable response, and improved response time. The controllable material, in one embodiment, may be a dispersion controlled (e.g., matched) polymer, offering uniform spectral characteristics of attenuation across a wavelength band of interest.

24 Claims, 5 Drawing Sheets

OTHER PUBLICATIONS

M.H. Cordaro et al., "Precision Fabrication of D–Shaped Single–Mode Optical Fibers by in Situ Monitoring," IEEE Journal of Lightwave Technology, vol. 12, No. 9, Sep. 9, 1994, pp. 1524–1531.

Ottokar et al., "Determination of Single–Mode Fiber Coupler Design Parameters from Loss Measurements", IEEE, Journal of Lightwave Technology, vol. LT–3, No. 4, Aug, 1985, pp. 864–867.

Digonnet et al., "Measurement of the core proximity in polished fiber substrates and couplers", Optics Letters, vol. 10, No. 9, Sep. 1985, pp. 463–465.

Pan et al., "Voltage–Controlled Optical Fiber Coupler Using a Layer of Low–Refractive Index Liquid Crystal with Positive Dielectric Anisotropy", Jpn. J. Appl. Phys., vol. 34, Part 1, No. 12A, Dec. 1995, pp. 6410–6415.

Mueller–Westerhoff et al., "The Synthesis of Dithiolene Dyes with Strong Near–IR Absorption", Tetrahedron Report No. 283, Tetrahedron vol. 47, No. 6, 1991, pp. 909–932.

J. Gower, "Optical Communication Systems", Ch. 3, 2nd Ed. 1993, pp. 58–77.

Kenny et al., "Control of Optical Fibre Taper Shape", Electronics Letters, vol. 27, No. 18, Aug. 29, 1991, pp. 1654–1656.

Love et al., "Quantifying Loss Minimisation in Single–Mode Fibre Tapers", Electronics Letters, vol. 22, No. 17, Aug. 14, 1986, pp. 912–914.

Diez et al., "Cynlindrical metal–coated optical fibre devices for filters and sensors", Electronics Letters, vol. 32, No. 15, Jul. 18, 1996, pp. 1390–1392.

Birks et al., "The Shape of Fiber Tapers", IEEE, Journal of Lightwave Technology, vol. 10, No. 4, Apr. 4, 1992, pp. 432–438.

Wagoner et al, pending U.S. patent application Ser. No. 09/139,832, filed Aug. 25, 1998, entitled "Blockless Techniques for Simultaneous Polishing of Multiple Fiber Optics".

Johnstone, W. et al., "Fibre Optic Modulators Using Active Multimode Waveguide Overlays" *Electronics Letters,* vol. 27, No. 11, pp. 894–896 (May 23, 1991).

Johnstone, W. et al., "Fiber–Optic Fefractometer that Utilizes Multimode Waveguide Overlay Devices," *Optics Letters,* vol. 17, No. 21, pp. 1538–1540 (Nov. 1, 1992).

McCallion, K. et al., "Investigation of Optical Fibre Switch Using Electro–Optic Interlays" *Electronic Letters,* vol. 28, No. 4, pp. 410–411 (Feb. 13, 1992).

Zhang, M. et al., "Single–mode fiber–film directional coupler" *Journal of Lightwave Technolgoy,* vol. LT–5, No. 2, pp. 260–264 (Feb. 1987).

* cited by examiner

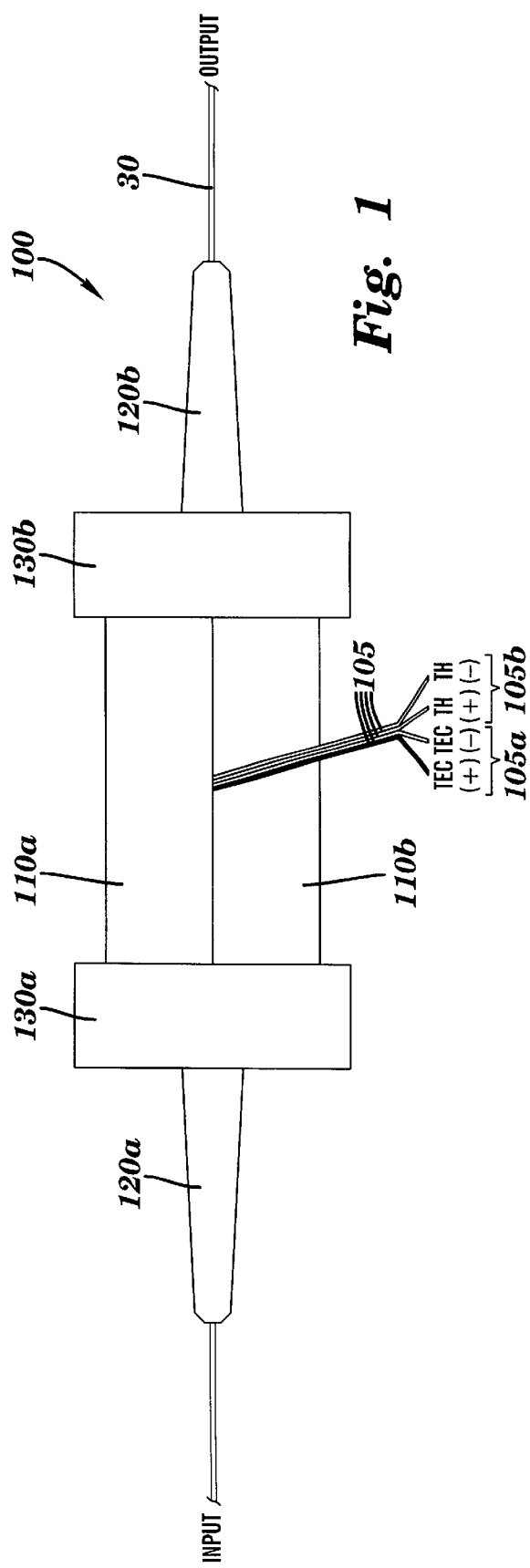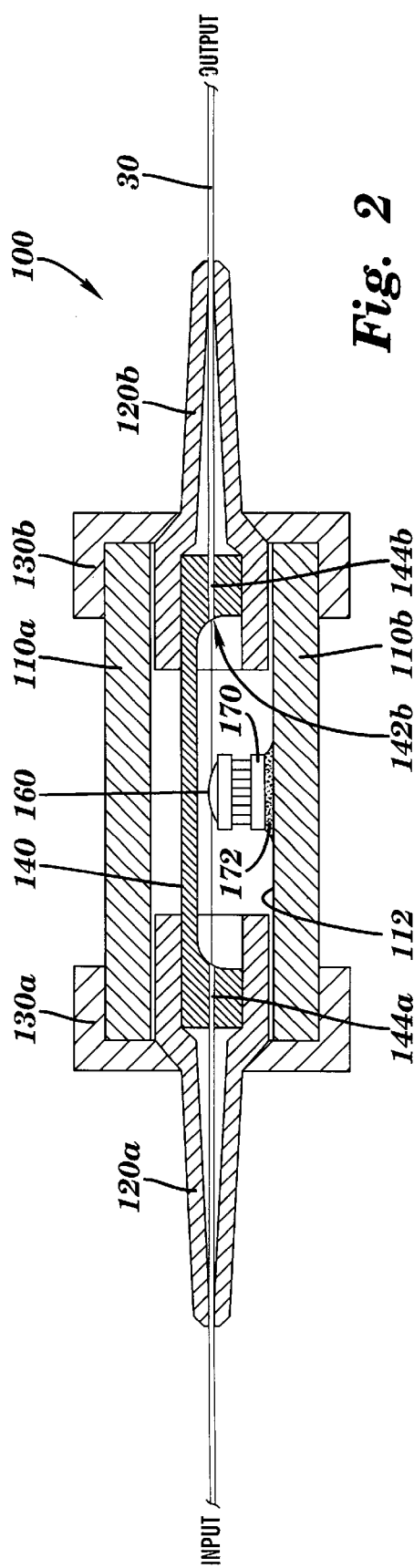

CONTROLLABLE FIBER OPTIC ATTENUATORS EMPLOYING TAPERED AND/OR ETCHED FIBER SECTIONS

CROSS-REFERENCE TO RELATED APPLICATIONS

This Application is related to U.S. patent application Ser. No. 09/139,457, filed Aug. 25, 1998, entitled "DISPERSION CONTROLLED POLYMERS FOR BROADBAND FIBER OPTIC DEVICES"; and U.S. patent application Ser. No. 09/139,832, filed Aug. 25, 1998, entitled "BLOCKLESS TECHNIQUES FOR SIMULTANEOUS POLISHING OF MULTIPLE FIBER OPTICS;" and U.S. patent application Ser. No. 09/139,787, filed Aug. 25, 1998, entitled "BLOCKLESS FIBER OPTIC ATTENUATORS AND ATTENUATION SYSTEMS EMPLOYING DISPERSION CONTROLLED POLYMERS" and U.S. patent application Ser. No. 09/026,755, filed Feb. 20, 1998, and entitled "FIBER OPTIC ATTENUATORS AND ATTENUATION SYSTEMS,." now U.S. Pat. No. 5,966,493.

Each of these Applications is hereby incorporated by reference herein in its entirety.

TECHNICAL FIELD

The present invention relates to controllable attenuators and attenuation systems for attenuating optical energy transmitted through a fiber optic, and in particular to the use of tapered fiber optic portions suspended in controllable materials to effect attenuation.

BACKGROUND OF THE INVENTION

Fiber optic systems often require precise control of optical signal levels entering various system components. This is particularly true for systems at test and characterization stages of deployment. A controllable optical attenuator can be used, for example, to characterize and optimize the optoelectronic response of high-speed photoreceivers, wherein the detection responsivity is dependent on the average optical power incident on the photodiode.

The majority of controllable fiber optic attenuators currently commercially available rely on thin-film absorption filters, which require breaking the fiber and placing the filters in-line. Controllable attenuation is then achieved mechanically by, for example, rotating or sliding the filter to change the optical path length within the absorptive material. This adversely impacts the response speed of the device, the overall mechanical stability, zero attenuation insertion loss and optical back reflection. In general, broken fiber designs suffer numerous disadvantages such as high insertion loss, significant back reflection, and large size. These factors can be minimized, although such corrective measures typically result in added cost and/or size.

Additional issues have impeded the development of thermo-optic variable attenuators, including: (i) the thermal mass of surrounding materials and/or structures which significantly degrade device response time; and (ii) spectrally non-uniform attenuation, resulting from a dispersion mismatch between the optical mode index of the underlying transmission media and a controllable overlay material.

As disclosed in the above-noted, commonly assigned, U.S. patent applications, techniques have been proposed to overcome these weaknesses by providing a "blockless" attenuator implementation. The "blockless" technique of suspending a portion of a fiber optic within a dispersion-controlled, controllable material, addresses the thermal mass responsivity and spectral uniformity problems. The portion of the fiber is modified to allow extraction of optical energy therefrom by the controllable material.

Now, additional species techniques of this fiber modification are desirable to improve the predictability, producibility, and costs of these attenuator devices.

What is required, therefore, are techniques which maintain the advantages of the blockless, dispersion-controlled variable optical attenuators previously disclosed, while at the same time providing increased producibility and improved performance. Tapering or etching the fiber optics, as discussed herein, provides these and other advantages.

SUMMARY OF THE INVENTION

The shortcomings of the prior approaches are overcome, and additional advantages are provided, by the present invention, which in one aspect relates to an attenuator having a tapered or etched portion of a fiber optic through which optical energy can be extracted. A controllable material is formed around the portion of the fiber optic for controllably extracting the optical energy in accordance with a changeable stimulus applied thereto. In the thermo-optic embodiment of the present invention, the changeable stimulus is temperature, and the tapered portion of the fiber optic is suspended through the controllable material and thereby substantially insulated from any heat sink structures in the attenuator.

The attenuator disclosed herein may be used as part as an attenuation system, which includes a control circuit coupled to the attenuator for controlling the amount of the changeable stimulus applied to the controllable material, and a level sense circuit, for sensing the optical energy in the fiber optic and/or the level of changeable stimulus and providing a result thereof to the control circuit.

To improve spectral uniformity of the response of the attenuator across a given wavelength band (e.g., 1520 nm to 1580 nm), the controllable material may have its optical dispersion properties controlled (e.g., matched) in accordance with those of the fiber in this band. Preferably, the controllable material has its optical dispersion properties substantially matched to those of the fiber in the band of interest. The control of the dispersion properties is effected using, for example, polymers with added dyes, discussed in detail in the above incorporated Application entitled "DISPERSION CONTROLLED POLYMERS FOR BROADBAND FIBER OPTIC DEVICES."

The present invention, in another aspect, relates to methods for attenuating optical energy in a fiber optic using the attenuator discussed above, as well as methods for forming the attenuator discussed above.

The "blockless," dispersion controlled attenuator of the present invention provides a high performance design with wide flexibility. The use of tapered or etched fiber optics provides additional cost, producibility and performance advantages.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

FIG. 1 is a front elevational view of a controllable fiber optic attenuator in accordance with the present invention;

FIG. 2 is a central, cross-sectional view of the attenuator of FIG. 1;

DETAILED DESCRIPTION OF THE PREFERRED EMBODIMENT(S)

Figure 3:
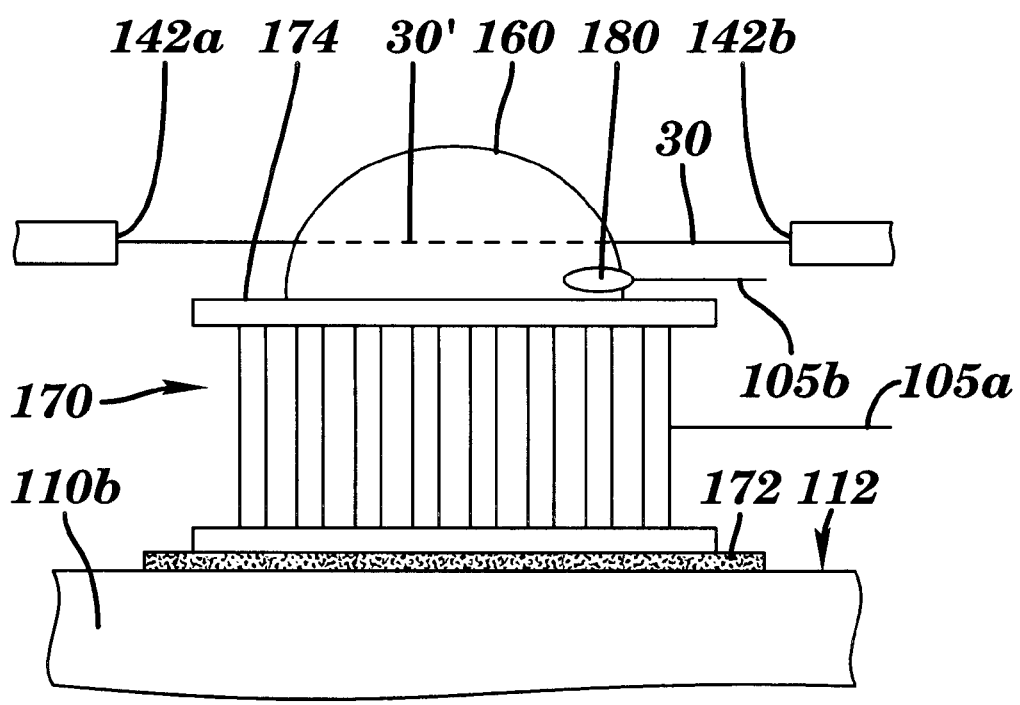
FIG. 3 is an enlarged view of certain internal features of the attenuator of FIGS. 1 and 2.

With reference to the elevational view of FIG. 1, an attenuator 100 is provided in accordance with the present invention for attenuating optical energy transmitted in fiber optic 30. Attenuator 100 includes a housing comprising, for example, strain reliefs 120a and 120b, shell pieces 110a and 110b, and end caps 130a and 130b. Control leads 105a and 105b may also be provided for attenuator control.

As discussed further below, the attenuator is formed with respect to a portion of the fiber optic having a tapered or etched surface through which optical energy can be controllably extracted. By maintaining the integrity of the fiber optic within this attenuator, unnecessary losses due to interruption of the fiber can be controlled. In one exemplary embodiment, the entire housing, including the strain reliefs, is 2.375 inches in length, and about 0.5 inches in diameter. Therefore, the attenuator of the present invention can be implemented in a relatively small package suitable for many types of system and/or field uses.

Internal details of attenuator 100 are shown in the central cross-sectional view thereof of FIG. 2. As discussed above, a housing comprising, in one example, strain reliefs 120a and 120b, end caps 130a and 130b, and shell pieces 110a and 110b is provided to accommodate the input and output sections of the fiber, as well as additional, internal components. Another exemplary portion of the housing, i.e., fiber support structure 140, is also shown in FIG. 2 having two support points 142a and 142b between which the fiber is suspended. These support points are at the ends of longitudinal notches 144a and 144b formed in structure 140 to accommodate the input and output portions of the fiber.

In accordance with the previously filed U.S. Applications discussed above, a bulk material, here designated 160, is formed over a surface of the fiber to controllably remove optical energy therefrom. Either electro-optic or thermo-optic materials are appropriate for this purpose, having refractive indices, and resultant attenuation effects, which vary according to applied electrical or thermal stimuli, respectively. Shown in FIG. 2 is an exemplary thermo-optic material 160 in surrounding the suspended portion of fiber optic 30, and with an underlying controllable heating/cooling (heating and/or cooling) source 170 which is mounted, via a thermally conductive epoxy or solder 172, to an inside wall 112 of shell piece 110b.

The suspension of the portion of the fiber 30 within only material 160, but without any other significant thermal contacts, results in an efficient, thermally insulated attenuation device such that any changes in temperature induced by the controllable heating/cooling source 170 are transferred solely, and quickly, to the thermo-optic material 160, but to no other surrounding structures. This "blockless" technique stands in contrast to prior techniques, wherein the fiber is mounted in a block, and any thermal changes in the material are also affected by the heat sink characteristics of the block on which the material is formed. In the approach disclosed herein, since the fiber is suspended in a thermally insulative environment (e.g., air or any other effective thermal insulator), and is in thermal contact with only material 160 (also thermally insulated except for its contact with source 170), the heat sink effect of surrounding structures is minimized, and faster and more predictable control of the temperature, and therefore the optical attenuating effects, are provided.

With reference to the enlarged view of FIG. 3, as discussed above, controllable heating/cooling source 170 is mounted to an inside housing wall 112, using epoxy or solder 172, and projects toward fiber optic 30. Source 170 supports a controllable material 160 on its active control surface 174. As discussed in greater detail below, a portion 30' of fiber optic 30 can be tapered or etched thereby exposing the evanescent field of the optical energy transmitted therein such that at least some of the optical energy can be controllably extracted therefrom, using controllable material 160.

The tapering or etching techniques significantly reduce the diameter of the fiber in this region to as low as 8–12 $\mu$m. This causes the optical power to be efficiently guided by the composite core/cladding/air guiding structure in the reduced diameter region. The evanescent field exists in the air and is, therefore, readily accessible within the surrounding controllable material 160 discussed above.

Figure 4:
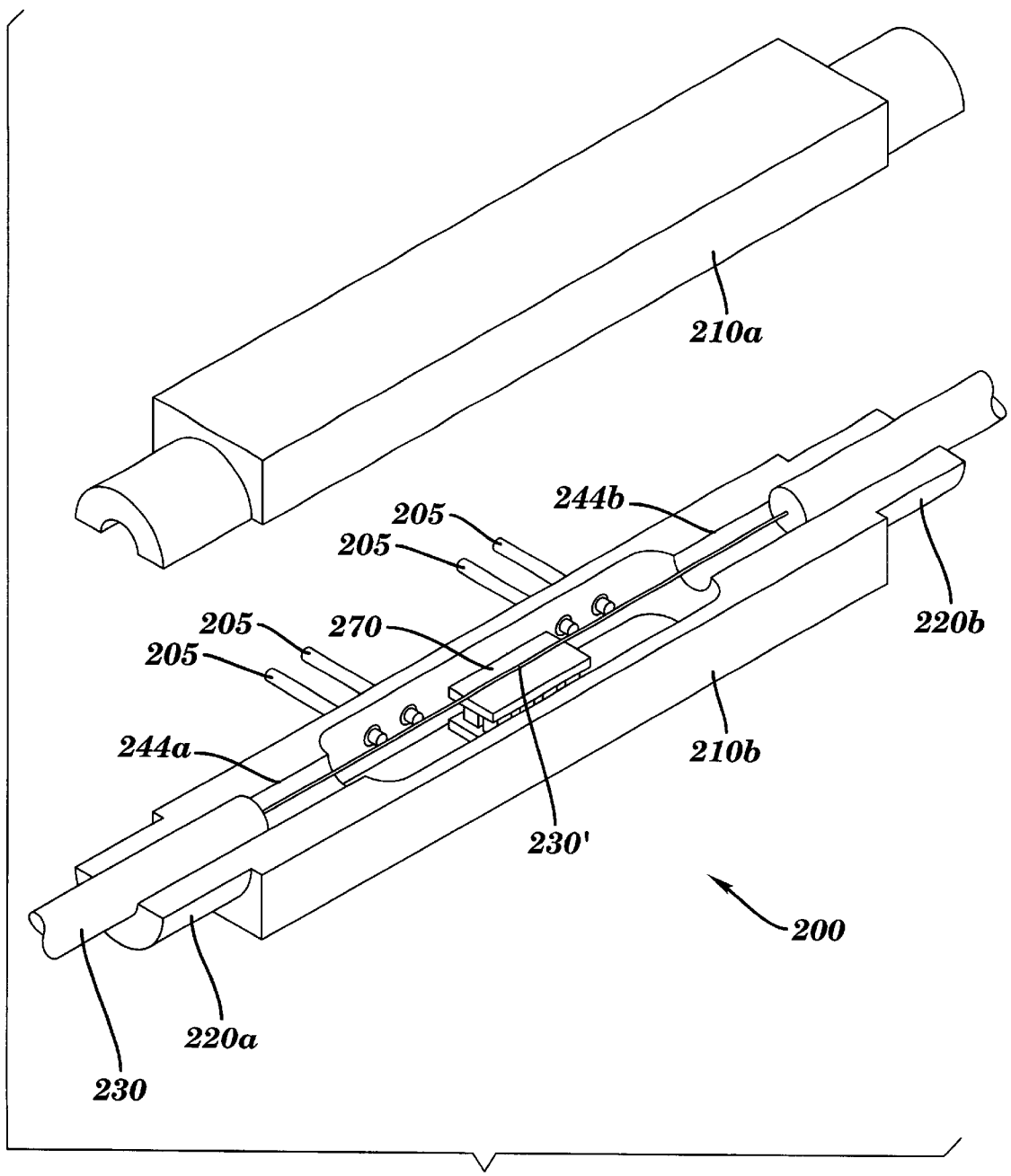
FIG. 4 depicts an alternate embodiment of the attenuator of FIGS. 1–2.

A currently preferred embodiment of the attenuator of the present invention is depicted in FIG. 4. Attenuator 200 includes a housing with two adjoining shell pieces 210a and 210b. The shell pieces each include complementary longitudinal notches 244a and 244b through which fiber 230 is run. Portion 230' of fiber 230 is tapered in accordance with the present invention and suspended in the housing, over heating/cooling source 270, through the controllable material (not shown for clarity). Strain relief portions 220a and 220b can be molded into the housing, and the housing can also accommodate control leads 105.

Figure 5:
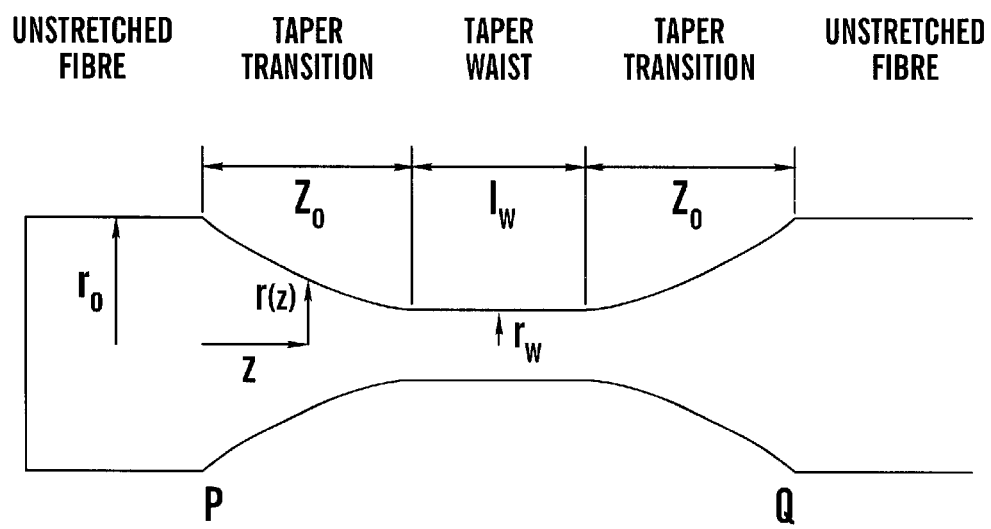
FIG. 5 is a side view of an exemplary tapered portion of a fiber optic to be integrated into a fiber optic attenuator in accordance with the principles of the present invention.
Figure 6:
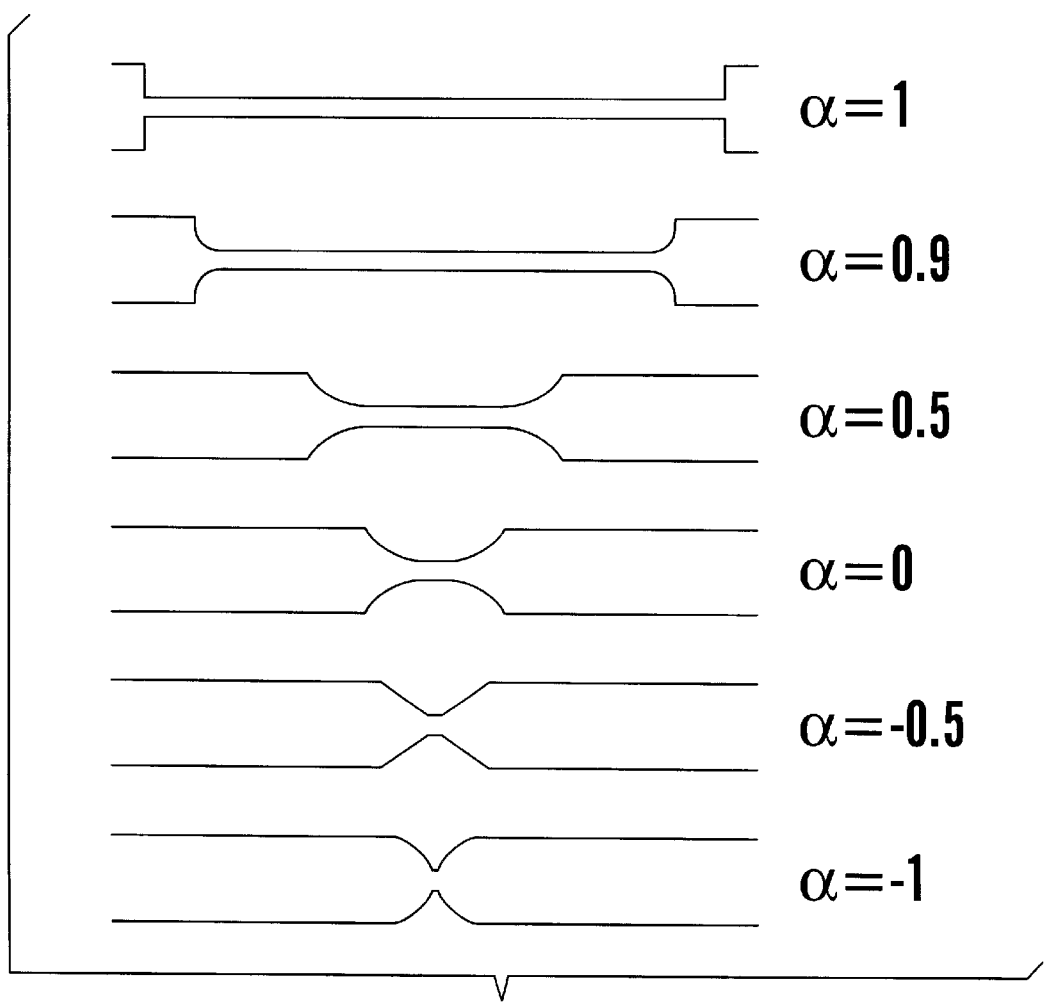
FIG. 6 depicts exemplary, alternate fiber optic taper profiles.

The use of tapered fiber optics previously has been for mode expanding and, in particular, fused biconical fiber couplers. Exemplary taper profiles are depicted in FIGS. 5 and 6 herein, and are further discussed in "The Shape of Fiber Tapers," IEEE Journal of Lightwave Technology, vol. 10, no. 4, April, 1992, which is hereby incorporated by reference herein in its entirety.

Fiber optic tapers can be produced by heating a portion of the fiber and carefully pulling the fiber in the longitudinal direction. As the fiber softens, it stretches and reduces in diameter, with the overall material volume remaining constant. Low loss propagation of optical power through the taper region can be achieved provided that the taper shape satisfies a criterion for adiabaticity at every point. This can be interpreted as ensuring that the localized taper angle remains below a value determined by the two lowest order modes of the composite guiding structure, the optical wavelength and the local radius of the fiber. For taper angles below the loss determining value, extremely efficient power transfer across the taper is achieved, with <0.03 dB excess loss. If the taper angle exceeds this value, a significant excess loss can be expected.

When the core and cladding diameters are reduced during the fusing/pulling process, the evanescent field spreads out across the reduced cladding thickness and reaches the outer air/cladding boundary. This is consistent with waveguide theory which predicts that a very weak guiding situation is created when the core and cladding diameters are reduced by a common factor. For a standard single-mode fiber, a reduction to a quarter of the initial diameter results in a core thickness of approximately 2 μm and cladding diameter of approximately 31 μm. This causes the mode effective index to move closer to the cladding index and as a result the evanescent tail penetration is greatly increased and reaches the cladding/air interface. When the fiber diameter is as low as 30 μm, then the composite core/cladding region acts as a new waveguide core with the new cladding being provided by air. This structure can support many guided modes due to the large index mismatch at the core/air interface and the relatively large thickness (approx. 30 μm). However, the fiber mode adiabatically transforms into the lowest order mode of the composite waveguide and efficiently traverses the taper region.

Similar fiber optic shapes can also be realized using etching techniques, or a combination of tapering and etching techniques. Exemplary etching techniques for fiber optics can be found in U.S. Pat. No. 5,290,398, issued Mar. 1, 1994, entitled "SYNTHESIS OF TAPERS FOR FIBER OPTIC SENSORS," U.S. Pat. No. 4,630,890, issued Dec. 23, 1986, entitled "EXPOSED CORE OPTICAL FIBERS, AND METHOD OF MAKING SAME," and U.S. Pat. No. 4,469,544, issued Sep. 4, 1984 and entitled "ETCHING FOUNTAIN". Each of these U.S. Patent documents is hereby incorporated by reference herein in its entirety. In general, the etching processes in those patents can be monitored similar to the techniques disclosed above for tapers, to provide the proper etching depth, shape, and evanescent field access.

In addition, a combination of tapering and etching can be employed to realize a suitable fiber optic shape.

Application of a controllable material such as a polymer with a refractive index near the mode effective index causes the guiding region to become lossy. This situation is analogous to that of the side-polished fiber attenuator previously disclosed with a polymer bulk overlay. The amount of loss induced is related to the strength of the evanescent tail at the cladding/air interface and the effective interaction region, which is determined by the slope of the taper. The strength of the evanescent tail is determined by the reduced diameter of the fiber and known coupling strength techniques be used to characterize the taper. Thermo-optic polymers will suffice for use with the tapered or etched devices herein. These polymers can easily operate (with a minimal temperature offset) to achieve the required result. Alternatively, other optimized polymers can be prepared as reformulations of those currently known.

For standard single-mode fiber, typical taper minimum diameters are in the 9–15 μm region for strong evanescent interaction with a probable uniform minimum waist length of around 3 mm. It may be preferable to design the interaction region length to about 1 mm for the purposes of higher speed operation. The interaction region length should also remain smaller than the size of the heating/cooling source so that uniform temperature and efficient changes in temperature are maintained over the interaction region.

The shape of an optimal short taper which satisfies the adiabaticity criterion is given by:

$$z(r) = \frac{2\pi}{f} \int_{r_0}^{r} \frac{dr}{r[\beta_1(r) - \beta_2(r)]}$$

where r is the localized fiber radius, $r_0$ is the minimum waist radius of the taper, $\beta_1(r)$ and $\beta_2(r)$ are respectively the localized propagation constants, in the transition, of the fundamental ($LP_{01}$) mode and the mode to which power loss is most likely ($LP_{02}$). The factor f effectively controls the amount of excess loss which is induced.

A fiber optic taper can be integrated into the "blockless" attenuator discussed above, with the dispersion-controlled material 160, FIGS. 1–3. Further, this type of attenuator will also be amenable to insertion into a controlled system, FIG. 7 below.

Referring to FIGS. 1–3 and 5, one exemplary fabrication technique for the attenuator 100 includes:

a) providing a tapered or etched portion 30' of the fiber (FIGS. 3 and 5);

b) suspending the portion of the fiber between two support points 142a and 142b of a fiber support structure (e.g., 140, FIG. 2) and gluing the adjacent input and output portions of the fiber in respective, preformed, longitudinal notches running outward toward the distal ends of the support structure;

c) affixing the controllable heating/cooling source 170 to an inner wall 112 of an outer shell piece 110b of a housing using a thermally conductive epoxy 172;

d) forming the controllable material 160 on a control surface 172 of the controllable heating/cooling source 170 such that it retains some softness (at least temporarily); and e) bringing the fiber support structure 140 and the shell piece 110b into their assembled relationship wherein the suspended, tapered fiber portion 30' is immersed in the softened controllable material 160 such that at least the interaction area 33 thereof is covered by a portion of material 160.

Referring to FIGS. 4 and 5, another exemplary fabrication technique for the attenuator 200 includes:

a) providing a tapered or etched portion 230' of the fiber (FIG. 4);

b) affixing the controllable heating/cooling source 270 to an inner wall of a first shell piece 210b using a thermally conductive epoxy;

c) suspending the portion of the fiber between two support points of the shell piece 210b and gluing the adjacent input and output portions of the fiber in their respective, preformed, longitudinal notches 244a and 244b running outward toward the distal ends of the shell piece;

d) heating the controllable heating/cooling source and applying thereto the controllable material (not shown in FIG. 4) over the fiber portion 230' and onto the source 270 such that it retains its softness while enveloping the fiber portion; and e) bringing the opposing shell piece 210a and the shell piece 210b into their assembled relationship using glue on the mating surfaces thereof.

Other manufacturing variants can be used to obtain the requisite suspension of the fiber optic portion through a controllable material in a support structure, in accordance with the principles of the present invention. Other options include modifying the surface of the controllable sources 170/270 to contain the controllable material applied thereto; and applying additional boots or strain relief to sections 220a and 220b of the assembled shell pieces in FIG. 4.

As discussed above with reference to FIGS. 1–4, material 160 may be controlled using a controllable heating/cooling source 170/270. Further, a sensor 180 can be placed (FIG. 3) in material 160, to measure the resultant temperature thereof. The signal representing the temperature can be carried from the attenuator using sense leads 105b, and the controllable heating/cooling source can be operated using control leads 105a.

Figure 7:
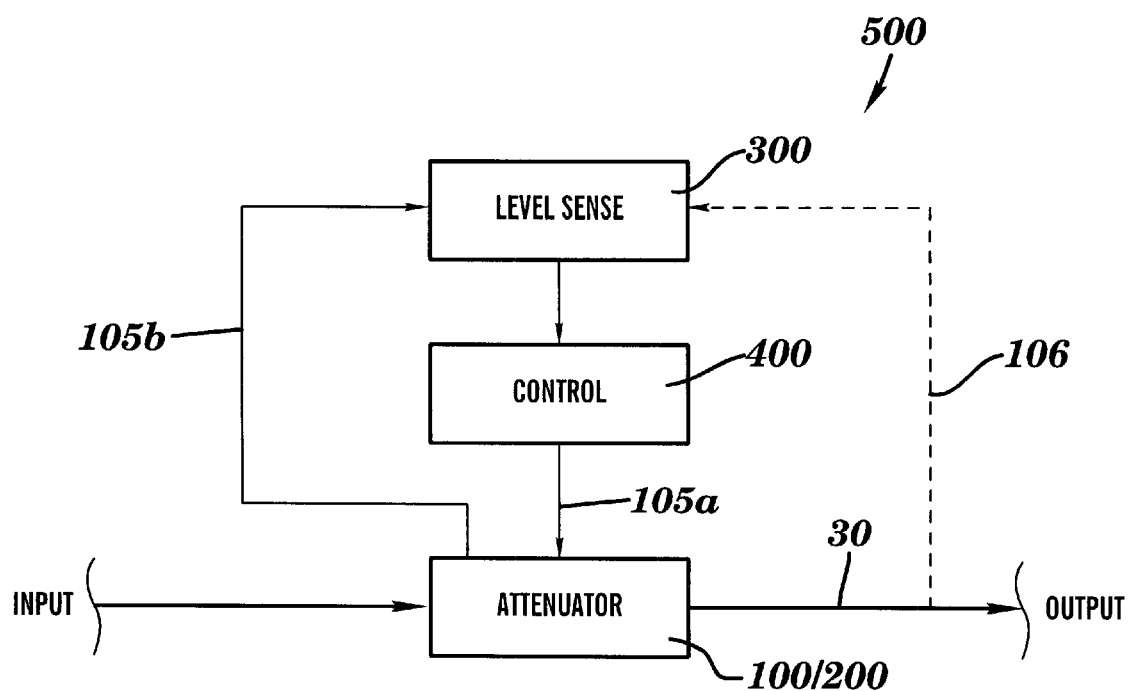
FIG. 7 is a system within which the attenuators of FIGS. 1–4 can be employed.

FIG. 7 depicts an exemplary system 500 employing attenuator 100 (or 200), and its electrical control leads 105a and sense leads 105b. Sense leads 105b can be operated by a sensing unit 300 which senses the temperature and/or optical signal levels in the fiber, and which provides a result thereof to control circuit 400, which in turn controls the signal levels on control lead 105a leading to the attenuator. The optical signal level can be indirectly measured from electrical levels recovered (i.e., demodulated) from the optical signal. The fiber sense leads can either be implemented inside of the attenuator, or outside the attenuator using an optical tap into the fiber nearby, and a sense lead (e.g., 106) running therefrom.

In one exemplary embodiment, the controllable heating/cooling source is a thermoelectric cooler (Melcor part number FCO.45-4-05); the thermal sensor is a thermistor (Fenwell Electronics part number 112-503JAJ-B01), and the fiber is a single mode fiber, (Corning part number SMF-28)

Improvement in the spectral uniformity of the device can be obtained through proper choice of the controllable material 160. More particularly, dispersion controlled polymers such as any of those disclosed in the above-incorporated, previously filed parent U.S. patent application entitled "DISPERSION CONTROLLED POLYMERS FOR BROADBAND FIBER OPTIC DEVICES," can be used as the controllable material 160 to improve spectral uniformity.

A mis-match between the dispersion characteristics of the material and the dispersion characteristics of the fiber may result in spectrally non-uniform attenuation across a band of interest (e.g., 1520–1580 nm). By controlling the dispersion of material 160, spectral uniformity can be improved. Preferably, the dispersion of material 160 should be controlled to be matched to that of the mode index of the fiber, thereby providing optimum spectral uniformity.

As explained in detail in the previously filed Application, polymers with added dyes provide the required dispersion control, and are also thermo-optically active. One preferred material comprises a polymer composition comprising:

(a) from about 0.2 to about 4% by weight of an infrared absorbing dye having an absorption maximum from about 900 to about 1200 nm; and (b) from about 96 to about 99.8% by weight of a polar olefin copolymer comprising monomeric units derived from two or more polar olefins having an ester, benzene or halogen substituent attached thereto.

The disclosed "blockless" approach, and the dispersion-matched thermo-optic materials, have permitted the development of the disclosed high performance, low cost broadband compact variable attenuator. The blockless approach allows fiber components to be produced with minimal size, weight and thermal mass. This dramatically reduces device size and thermo-optic response time (to possibly about 0.1 second). Further, the incorporation of dispersion matched materials yields devices which have a spectrally uniform response, which is especially desirable for broadband applications. The controllable material completely envelopes the tapered or etched portion of the fiber optic, leading to improved performance and control.

In addition to these benefits, the blockless approach also retains the intrinsic performance characteristics of continuous fiber devices: low insertion loss, low back reflection (return loss), and low polarization-dependent loss ("PDL"). Exemplary performance levels of the disclosed attenuator are shown below in Table 1.

TABLE 1

| QUANTITY | VALUE | UNIT |
| --- | --- | --- |
| Dynamic Range | >50 | dB |
| Spectral Variance (1500–1600 nm) | 0.3 | dB |
| Excess Loss | 0.05 | dB |
| PDL | 0.2 | dB |
| Return Loss | <−60 | dB |
| Optical Power Handling | >20 | dBm |
| DC Power Consumption | <200 | mW |

In fact, since the thermo-optic material can be deposited 360 degrees around the tapered section (unlike in the previously disclosed side-polished approaches), better PDL and dynamic range are possible, i.e., up to about 0.05 dB and >55 dB, respectively.

In accordance with the present invention, it is also possible to develop more sophisticated designs such as ovenized and/or multiple thermo-electric cooling devices to improve device stability. Further, because of the design flexibility afforded by the dispersion-matched polymers (i.e., control of the refractive index), it is possible to design custom applications which exhibit minimal power consumption and varying operating temperatures.

In summary, the blockless, dispersion matched fiber optic attenuator of the present invention is a high performance design with broad flexibility. The simplicity of the design permits low-cost, high-volume manufacturing without sacrificing performance. Advantages of the tapered or etched approaches include cost, producibility, and performance. Finally, after initial investments are made in the taper/etch production, production throughput can be increased.

While the invention has been particularly shown and described with reference to preferred embodiment(s) thereof, it will be understood by those skilled in the art that various changes in form and details may be made therein without departing from the spirit and scope of the invention.

What is claimed is:

1. An optical attenuator, comprising:

a tapered portion of a fiber optic having a side surface through which optical energy can be extracted;

a controllable material formed around the tapered portion of the fiber optic for controllably extracting said optical energy in accordance with a changeable stimulus applied thereto, wherein the controllable material has its optical dispersion properties tailored in accordance with those of the fiber optic across a given wavelength band.

2. The optical attenuator of claim 1, wherein the controllable material comprises a polymer composition comprising:

(a) an infrared absorbing dye having an absorption maximum from about 900 to about 1200 nm; and (b) a polar olefin copolymer comprising monomeric units derived from two or more polar olefins having an ester, benzene or halogen substituent attached thereto.

3. An optical attenuator, comprising:

a tapered portion of a fiber optic having a side surface through which optical energy can be extracted, disposed in a housing;

a controllable material formed around the tapered portion of the fiber optic for controllably extracting said optical energy in accordance with a changeable stimulus applied thereto, wherein the changeable stimulus comprises temperature, and the tapered portion of the fiber optic is suspended in the housing to be substantially thermally insulated from any heat sink structures in said attenuator by air or other effective thermal insulator.

4. An attenuation system in combination with the optical attenuator of claims 1 or 3, the system comprising:

a control circuit coupled to the attenuator for controlling an amount of the changeable stimulus applied to the controllable material; and a level sense circuit, coupled in said system, for sensing the optical energy in said fiber optic and/or the level of changeable stimulus and providing a result thereof to the control circuit.

5. A method for attenuating optical energy transmitted in a fiber optic, comprising:

providing a tapered portion of the fiber optic having a side surface through which at least some of said optical energy can be controllably extracted;

forming a controllable material around the tapered portion of the fiber optic for controllably extracting the at least some of said optical energy in accordance with a changeable stimulus applied thereto, wherein the controllable material has its optical dispersion properties tailored in accordance with those of the fiber optic across a given wavelength band.

6. The method of claim 5, wherein the controllable material comprises a polymer composition comprising:

(a) an infrared absorbing dye having an absorption maximum from about 900 to about 1200 nm; and (b) a polar olefin copolymer comprising monomeric units derived from two or more polar olefins having an ester, benzene or halogen substituent attached thereto.

7. A method for attenuating optical energy transmitted in a fiber optic, comprising:

providing, in a housing, a tapered portion of the fiber optic having a side surface through which at least some of said optical energy can be controllably extracted;

forming a controllable material around the tapered portion of the fiber optic for controllably extracting the at least some of said optical energy in accordance with a changeable stimulus applied thereto, wherein the changeable stimulus comprises temperature, and the tapered portion of the fiber optic is suspended in the housing to be substantially thermally insulated from any heat sink structures in the attenuator by air or other effective thermal insulator.

8. The method of claims 5 or 7, further comprising:

using a control circuit for controlling an amount of the changeable stimulus applied to the controllable material;

using a level sense circuit to sense the optical energy in said fiber and/or the level of changeable stimulus and providing a result thereof to the control circuit.

9. A method for forming an attenuator in relation to a fiber optic through which optical energy is to be transmitted, comprising:

providing a tapered portion of the fiber optic in the attenuator having a side surface through which at least some of said optical energy can be controllably extracted;

forming a controllable material around the tapered portion of the fiber optic, the controllable material for controllably extracting the at least some of the optical energy in accordance with a changeable stimulus applied thereto, wherein the controllable material has its optical dispersion properties tailored in accordance with those of the fiber optic across a given wavelength band.

10. The method of claim 9, wherein the controllable material comprises a polymer composition comprising:

(a) an infrared absorbing dye having an absorption maximum from about 900 to about 1200 nm; and (b) a polar olefin copolymer comprising monomeric units derived from two or more polar olefins having an ester, benzene or halogen substituent attached thereto.

11. A method for forming an attenuator in relation to a fiber optic through which optical energy is to be transmitted, comprising:

providing, in a housing, a tapered portion of the fiber optic having a side surface through which at least some of said optical energy can be controllably extracted;

forming a controllable material around the tapered portion of the fiber optic, the controllable material for controllably extracting the at least some of the optical energy in accordance with a changeable stimulus applied thereto, wherein the changeable stimulus comprises temperature, the method further comprising:

suspending the tapered portion of the fiber optic in the housing to thereby substantially thermally insulate the portion from any heat sink structures by air or other effective thermal insulator.

12. A method of forming an attenuation system in combination with the method of forming an attenuator of claims 9 or 11, the method comprising:

coupling a control circuit to the attenuator for controlling an amount of the changeable stimulus applied to the controllable material; and providing a level sense circuit for sensing the optical energy in said fiber optic and/or the level of changeable stimulus and providing a result thereof to the control circuit.

13. An optical attenuator, comprising:

an etched portion of a fiber optic having a side surface through which optical energy can be extracted;

a controllable material formed around the etched portion of the fiber optic for controllably extracting said optical energy in accordance with a changeable stimulus applied thereto, wherein the controllable material has its optical dispersion properties tailored in accordance with those of the fiber optic across a given wavelength band.

14. The optical attenuator of claim 13, wherein the controllable material comprises a polymer composition comprising:

(a) an infrared absorbing dye having an absorption maximum from about 900 to about 1200 nm; and (b) a polar olefin copolymer comprising monomeric units derived from two or more polar olefins having an ester, benzene or halogen substituent attached thereto.

15. An optical attenuator, comprising:

an etched portion of a fiber optic having a side surface through which optical energy can be extracted, disposed in a housing;

a controllable material formed around the etched portion of the fiber optic for controllably extracting said optical energy in accordance with a changeable stimulus applied thereto, wherein the changeable stimulus comprises temperature, and the etched portion of the fiber optic is suspended in the housing to be substantially thermally insulated from any heat sink structures in said attenuator by air or other effective thermal insulator.

16. An attenuation system in combination with the optical attenuator of claims 13 or 15, the system comprising:
   a control circuit coupled to the attenuator for controlling an amount of the changeable stimulus applied to the controllable material; and
   a level sense circuit, coupled in said system, for sensing the optical energy in said fiber optic and/or the level of changeable stimulus and providing a result thereof to the control circuit.

17. A method for attenuating optical energy transmitted in a fiber optic, comprising:
   providing an etched portion of the fiber optic having a side surface through which at least some of said optical energy can be controllably extracted;
   forming a controllable material around the etched portion of the fiber optic for controllably extracting the at least some of said optical energy in accordance with a changeable stimulus applied thereto, wherein the controllable material has its optical dispersion properties tailored in accordance with those of the fiber optic across a given wavelength band.

18. The method of claim 17, wherein the controllable material comprises a polymer composition comprising:
   (a) an infrared absorbing dye having an absorption maximum from about 900 to about 1200 nm; and
   (b) a polar olefin copolymer comprising monomeric units derived from two or more polar olefins having an ester, benzene or halogen substituent attached thereto.

19. A method for attenuating optical energy transmitted in a fiber optic, comprising:
   providing, in a housing, an etched portion of the fiber optic having a side surface through which at least some of said optical energy can be controllably extracted;
   forming a controllable material around the etched portion of the fiber optic for controllably extracting the at least some of said optical energy in accordance with a changeable stimulus applied thereto, wherein the changeable stimulus comprises temperature, and the etched portion of the fiber optic is suspended in the housing to be substantially thermally insulated from any heat sink structures in the attenuator by air or other effective thermal insulator.

20. The method of claims 17 or 19, further comprising:
   using a control circuit for controlling an amount of the changeable stimulus applied to the controllable material;
   using a level sense circuit to sense the optical energy in said fiber and/or the level of changeable stimulus and providing a result thereof to the control circuit.

21. A method for forming an attenuator in relation to a fiber optic through which optical energy is to be transmitted, comprising:
   providing an etched portion of the fiber optic having a side surface in the attenuator through which at least some of said optical energy can be controllably extracted;
   forming a controllable material around the etched portion of the fiber optic, the controllable material for controllably extracting the at least some of the optical energy in accordance with a changeable stimulus applied thereto, wherein the controllable material has its optical dispersion properties tailored in accordance with those of the fiber optic across a given wavelength band.

22. The method of claim 21, wherein the controllable material comprises a polymer composition comprising:
   (a) an infrared absorbing dye having an absorption maximum from about 900 to about 1200 nm; and
   (b) a polar olefin copolymer comprising monomeric units derived from two or more polar olefins having an ester, benzene or halogen substituent attached thereto.

23. A method for forming an attenuator in relation to a fiber optic through which optical energy is to be transmitted, comprising:
   providing, in a housing, an etched portion of the fiber optic having a side surface through which at least some of said optical energy can be controllably extracted;
   forming a controllable material around the etched portion of the fiber optic, the controllable material for controllably extracting the at least some of the optical energy in accordance with a changeable stimulus applied thereto,
wherein the changeable stimulus comprises temperature, the method further comprising:
   suspending the etched portion of the fiber optic in the housing to thereby substantially thermally insulate the portion from any heat sink structures by air or other effective thermal insulator.

24. A method of forming an attenuation system in combination with the method of forming an attenuator of claims 21 or 23, the method comprising:
   coupling a control circuit to the attenuator for controlling an amount of the changeable stimulus applied to the controllable material; and
   providing a level sense circuit for sensing the optical energy in said fiber optic and/or the level of changeable stimulus and providing a result thereof to the control circuit.

* * * * *